(12) United States Patent
Goetzke et al.

(10) Patent No.: US 9,341,123 B2
(45) Date of Patent: May 17, 2016

(54) EXHAUST SYSTEM HAVING EGR THROUGH COMPRESSION VALVE

(71) Applicant: Electro-Motive Diesel, Inc., LaGrange, IL (US)

(72) Inventors: Michael B. Goetzke, Orland Park, IL (US); Reddy Pocha Siva Sankara, Lisle, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 275 days.

(21) Appl. No.: 13/907,754

(22) Filed: May 31, 2013

(65) Prior Publication Data

US 2014/0352672 A1    Dec. 4, 2014

(51) Int. Cl.
*F02D 13/02* (2006.01)
*F02M 25/07* (2006.01)

(52) U.S. Cl.
CPC ....... *F02D 13/0276* (2013.01); *F02M 25/0707* (2013.01); *F02M 25/0749* (2013.01); *F02M 25/0731* (2013.01); *F02M 25/0751* (2013.01); *Y02T 10/121* (2013.01); *Y02T 10/18* (2013.01)

(58) Field of Classification Search
CPC .......... F02D 13/0276; F02M 25/0707; F02M 25/0749; F02M 25/0751; F02M 25/0731; F02M 25/07; Y02T 10/18; Y02T 10/121; Y02T 10/47
USPC .............. 123/568.21, 568.11, 179.16, 179.1, 123/182.1
See application file for complete search history.

(56) References Cited

U.S. PATENT DOCUMENTS

| | | | | |
|---|---|---|---|---|
| 1,439,798 | A * | 12/1922 | Crane | 123/182.1 |
| 2,002,518 | A * | 5/1935 | Baldwin | B62D 55/02 180/15 |
| 2,139,723 | A * | 12/1938 | Carter | B60K 41/00 192/3.59 |
| 3,115,033 | A * | 12/1963 | Blowers | G01L 19/0007 73/756 |
| 3,938,378 | A * | 2/1976 | Fineman | G01L 23/085 73/114.23 |
| 4,619,228 | A * | 10/1986 | Liu | 123/182.1 |
| 4,651,525 | A * | 3/1987 | Cestero | F01B 17/02 60/407 |
| 5,121,734 | A * | 6/1992 | Grieshaber et al. | 123/568.17 |
| 6,557,510 | B2 * | 5/2003 | Sjovall et al. | 123/182.1 |
| 6,988,365 | B2 * | 1/2006 | Sasaki | 60/605.2 |
| 7,047,924 | B1 * | 5/2006 | Waters | F01L 13/0036 123/345 |
| 7,249,583 | B2 * | 7/2007 | Bidner et al. | 123/198 DB |
| 7,383,820 | B2 * | 6/2008 | Lewis et al. | 123/491 |
| 7,481,039 | B2 * | 1/2009 | Surnilla et al. | 60/274 |
| 7,917,282 | B2 * | 3/2011 | Turner et al. | 701/108 |
| 7,941,999 | B2 * | 5/2011 | Kasper et al. | 60/605.2 |
| 2011/0056199 | A1 | 3/2011 | Gokhale et al. | |
| 2012/0000448 | A1 * | 1/2012 | Freund et al. | 123/568.21 |
| 2012/0078492 | A1 * | 3/2012 | Freund et al. | 701/108 |

FOREIGN PATENT DOCUMENTS

| | | |
|---|---|---|
| EP | 1 630 386 A1 | 8/2004 |
| EP | 1 640 596 A1 | 9/2004 |
| FR | 2 867 517 | 3/2004 |
| JP | 58096159 | 6/1983 |

* cited by examiner

*Primary Examiner* — Stephen K Cronin
*Assistant Examiner* — Susan E Scharpf
(74) *Attorney, Agent, or Firm* — Finnegan, Henderson, Farabow, Garrett & Dunner, LLP

(57) ABSTRACT

An exhaust system is disclosed for use with an engine. The exhaust system may have a compression relief valve associated with an engine cylinder. The exhaust system may also have an exhaust gas recirculation passage extending from the compression relief valve to an intake of the engine cylinder.

18 Claims, 1 Drawing Sheet

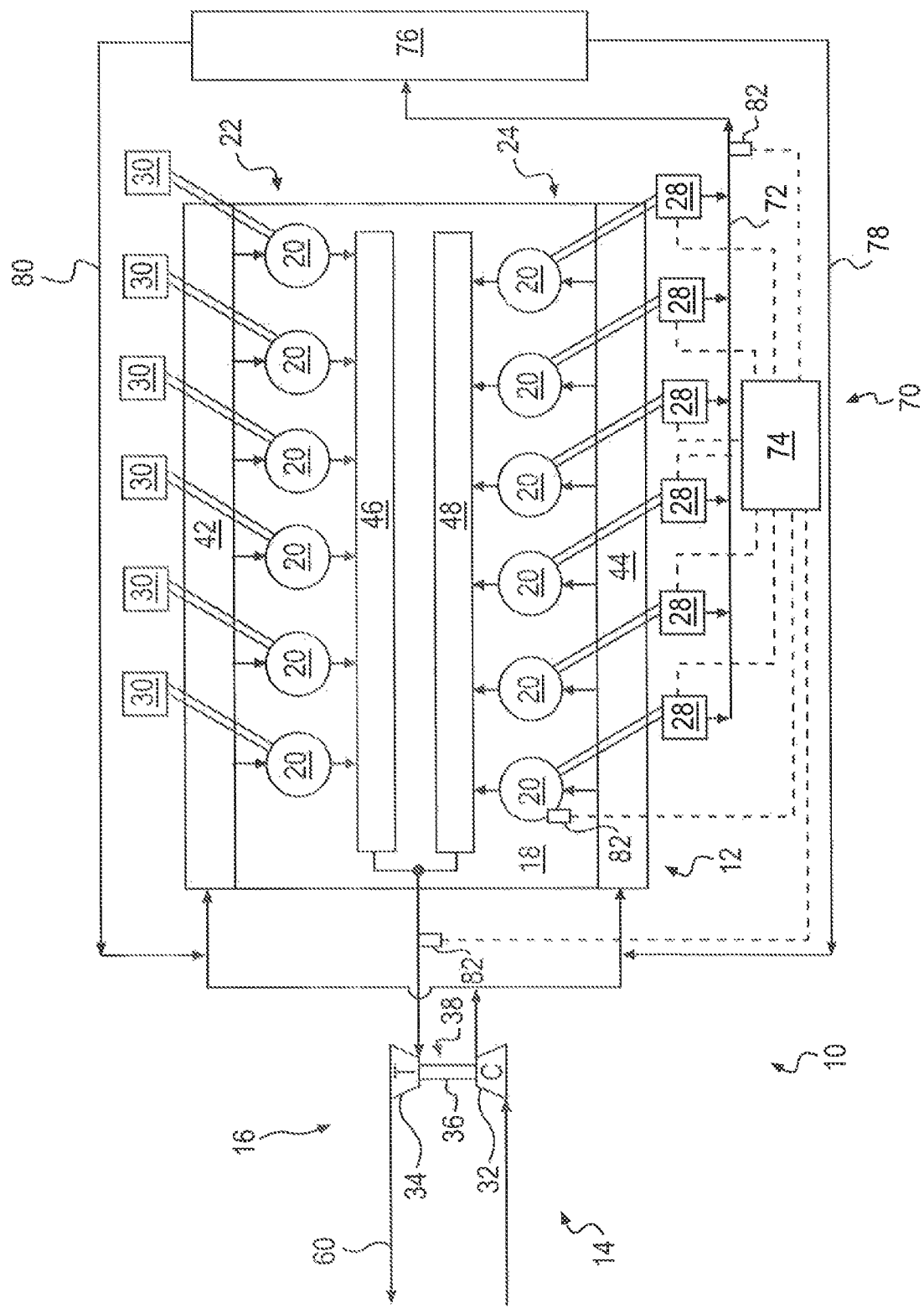

EXHAUST SYSTEM HAVING EGR THROUGH COMPRESSION VALVE

TECHNICAL FIELD

The present disclosure is directed to an exhaust system and, more particularly, to an exhaust system having exhaust gas recirculation (EGR) through a compression valve.

BACKGROUND

Combustion engines such as diesel engines, gasoline engines, and gaseous fuel-powered engines are supplied with a mixture of air and fuel for combustion within the engine that generates a mechanical power output and a flow of exhaust gases. The exhaust gases can include a complex mixture of air pollutants produced as byproducts of the combustion process. And due to increased attention on the environment, the amount of pollutants emitted to the atmosphere from an engine can be regulated depending on the type of engine, size of engine, and/or class of engine.

One method that has been implemented by engine manufacturers to comply with the regulation of exhaust emissions includes utilizing an exhaust gas recirculation (EGR) circuit. EGR circuits operate by recirculating a portion of the exhaust produced by the engine back to the intake of the engine to mix with fresh combustion air. The resulting mixture, when ignited, produces a lower combustion temperature and a corresponding reduced amount of regulated pollutants.

Typically, EGR circuits utilize one of the following two strategies: a donor cylinder strategy or a pumped EGR strategy. The donor cylinder strategy includes an EGR passage that receives exhaust from one or more donor cylinders, and a normal exhaust passage that extends parallel to the EGR passage. As part of the strategy, a restriction is selectively applied to the normal exhaust passage, causing more of the exhaust flow from the donor cylinders to be recirculated back to the intake of the engine. The pumped EGR strategy includes an external pump and/or compressor that draws exhaust from some of the engine cylinders and recirculates the exhaust back into the intake of the engine.

An exemplary engine implementing the donor cylinder strategy is disclosed in U.S. Patent Publication No. 2012/0000448 of Freund et al. that published on Jan. 5, 2012 ("the '448 publication"). In particular, the '448 publication discloses a diesel engine system including a group of donating cylinders and a group of non-donating cylinders. The system also includes an exhaust manifold, an exhaust gas recirculation (EGR) manifold, and one or more valve sets associated with the donating cylinders. The EGR manifold is coupled with an outlet conduit of each donating cylinder and recirculates the exhaust generated in the donating cylinders back to the donating cylinders and/or the non-donating cylinders as part of the intake air that is received by the cylinders. The valve sets direct exhaust generated by one or more of the donating cylinders between the exhaust manifold and the EGR manifold.

Although the exhaust system of the '448 publication may provide for reduced emissions in some applications, it may still be less than optimal. In particular, the use of dedicated valve sets for exhaust gas recirculation can increase the number of components in the exhaust system, resulting in an increase in cost and complexity of the engine and its associated control system.

The disclosed exhaust system is directed to overcoming one or more of the problems set forth above and/or other problems of the prior art.

SUMMARY

In one aspect, the present disclosure is directed toward an exhaust system for an engine. The exhaust system may include a compression relief valve associated with an engine cylinder. The exhaust system may also include an exhaust gas recirculation passage extending from the compression relief valve to an intake of the engine cylinder.

In another aspect, the present disclosure is directed to a method of handling exhaust from an engine. The method may include selectively opening a compression relief valve to decrease a pressure associated with an engine cylinder prior to engine startup. The method may also include selectively opening the compression relief valve to send exhaust from the engine cylinder through an exhaust gas recirculation passage and back into the engine cylinder during normal engine operation.

BRIEF DESCRIPTION OF THE DRAWING

FIG. 1 is a schematic illustration of an exemplary disclosed power system.

DETAILED DESCRIPTION

FIG. 1 illustrates a power system 10 having an engine 12, an air induction system 14, and an exhaust system 16. For the purposes of this disclosure, engine 12 is depicted and described as a four-stroke diesel engine. One skilled in the art will recognize, however, that engine 12 may be any other type of combustion engine such as, for example, a two- or four-stroke gasoline, natural gas, or other gaseous fuel-powered engine. Air induction system 14 may be configured to direct air or a mixture of air and fuel into engine 12 for combustion. Exhaust system 16 may be configured to direct combustion exhaust from engine 12 to the atmosphere.

Engine 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. Each cylinder 20, piston, and cylinder head may together at least partially define a combustion chamber. In the illustrated embodiment, engine 12 includes twelve cylinders 20 arranged in a V-configuration (i.e., a configuration having first and second banks 22, 24 or rows of cylinders 20). However, it is contemplated that engine 12 may include a greater or lesser number of cylinders 20 and that cylinders 20 may be arranged in an inline configuration, in an opposing-piston configuration, or in another configuration, if desired.

Engine 12 may also be equipped with one or more compression relief valves associated with a respective cylinder 20. Each compression relief valve may be located in fluid communication with the combustion chamber of its respective cylinder 20. In some embodiments, the compression relief valve may be at least partially disposed within the cylinder head of cylinder 20 and fluidly connect with a relief port of the cylinder head. It should be noted that other valves and/or ports may also be disposed within each cylinder head, such as for example, intake valves, exhaust valves, and/or ports associated with the intake and exhaust valves.

In the disclosed embodiment, engine 12 has two types of compression relief valves, including electronically controlled compression relief valves 28 and mechanically controlled compression relief valves 30. Prior to normal engine operation, compression relief valves 28, 30 may be used to decrease pressure within their respective combustion chambers. Specifically, compression relief valves 28, 30 may be opened to extract air and/or liquid (e.g. water, lube oil, fuel) from the combustion chambers. This may be required during engine maintenance and/or after engine 12 has experienced a substantial period of inactivity. The decreased pressure may aid starting in some applications.

Compression relief valves 30 may require an operator to initiate actuation. For example, compression relief valves 30 may be configured to be manually adjusted to any position between a flow-blocking (i.e., closed position) and a flow-passing position (i.e., open position). In one embodiment, each compression relief valve 30 may be externally threaded such that the operator screws the valve into its respective relief port with the application of torque from a standard ratchet tool. In another embodiment, the operator may push or pull compression relief valves 30 to move the valves between flow-blocking and flow-passing positions. Because compression relief valves 30 require the operator to move the valves between the open and closed positions, compression relief valves 30 may generally be opened only prior to normal engine operation (e.g., prior to engine startup), and remain closed during normal engine operation (i.e., during non-startup operation). In the embodiment shown, compression relief valves 30 are in direct fluid communication with the atmosphere.

On the other hand, compression relief valves 28 may be electronically actuated by a controller 74, which may allow enhanced functionality. For instance, compression relief valves 28 may be solenoid-operated valves having a valve element movable to any position between a flow-blocking and a flow-passing position. The valve elements of compression relief valves 28 may be biased toward the flow-blocking position and movable toward the flow-passing position based on a signal from controller 74. Because compression relief valves 28 may not require physical interaction with the operator, they may be utilized during normal engine operation.

Controller 74 may embody a single microprocessor or multiple microprocessors that include a means for controlling an operation of compression relief valves 28. Numerous commercially available microprocessors can be configured to perform the functions of controller 74. It should be appreciated that controller 74 could readily be embodied in a general machine microprocessor capable of controlling numerous machine functions. Controller 74 may include a memory, a secondary storage device, a processor, and any other components for running an application. Various other circuits may be associated with controller 74 such as power supply circuitry, signal conditioning circuitry, solenoid driver circuitry, and other types of circuitry.

Air induction system 14 may include multiple components configured to condition and introduce compressed air into cylinders 20. For example, air induction system 14 may include at least one compressor 32 in fluid communication with cylinders 20 via first and second intake manifolds 42, 44. Intake manifold 42 may be associated with bank 22 of cylinders 20, while intake manifold 44 may be associated with bank 24 of cylinders 20. Compressor 32 may embody a fixed geometry compressor, a variable geometry compressor, or any other type of compressor configured to receive air and compress the air to a desired pressure level. It is contemplated that air induction system 14 may also include one or more coolers (not shown) located to cool air compressed by compressor 32 before it enters the combustion chambers of engine 12.

Exhaust system 16 may include, among other things, at least one turbine 34 driven by the exhaust from first and second exhaust manifolds 46, 48 to rotate compressor 32 of air induction system 14. Exhaust manifold 46 may be associated with bank 22 of cylinders 20, while exhaust manifold 48 may be associated with bank 24 of cylinders. Each turbine 34 may embody a fixed geometry turbine, a variable geometry turbine, or any other type of turbine configured to receive exhaust and convert potential energy in the exhaust to a mechanical rotation. Turbine 34 may be directly and mechanically connected to compressor 32 by way of a shaft 36 to form a turbocharger 38. As the hot exhaust gases exiting engine 12 move through turbines 34 and expand therein, turbines 34 may rotate and drive the connected compressors 32 to pressurize inlet air.

After passing through turbine 34, the exhaust may first be treated before being discharged to the atmosphere via a common passage 60. In particular, one or more exhaust treatment devices (not shown) may be located to receive the exhaust from turbine 34. The exhaust treatment devices may include, for example, a particulate filter, one or more catalysts, or another treatment device known in the art. The exhaust treatment devices may be configured to remove, trap, reduce, or otherwise convert pollutants in the exhaust flow of engine 12 to innocuous substances.

Exhaust system 16 may also include an exhaust gas recirculation (EGR) circuit 70 configured to selectively divert exhaust to air induction system 14 from a location upstream of turbine 34. In particular, EGR circuit 70 may be fluidly connected at a first end with one or more cylinders 20 in a manner separate from exhaust manifolds 46, 48 and at an opposing second end with air induction system 14. In the disclosed exemplary embodiment, EGR circuit 70 includes an exhaust gas recirculation manifold (EGR) manifold 72 configured to receive exhaust from compression relief valves 28. In some embodiments, multiple parallel passages may extend from compression relief valves 28 to EGR manifold 72. Compression relief valves 28 may be configured to selectively allow or block a flow of exhaust through EGR circuit 70. For example, controller 74 may cause one or more compression relief valves 28 to move to any position between the flow-blocking and flow-passing positions during normal engine operation. In one embodiment, controller 74 may be capable of moving one or more compression relief valves 28 toward the flow-passing position during at least a portion of the power/exhaust/intake stroke of the associated piston of engine 12, such that a desired amount or flow-rate of exhaust at a desired temperature and/or pressure may be pushed from the associated cylinders 20 through EGR circuit 70 to intake manifolds 42, 44.

EGR circuit 70 also includes two parallel passages 78, 80 that separately extend from EGR manifold 72 to intake manifolds 42, 44 at locations within air induction system 14 that are downstream of compressor 32. A cooler 76 may be disposed in between EGR manifold 72 and passages 78, 80 to cool exhaust passing through. Cooler 76 may be any type of heat exchanger known in the art that is configured to cool exhaust flowing through EGR circuit 70. For example, cooler 76 may be an air-to-liquid type of heat exchanger that receives coolant from and returns coolant to engine 12 (e.g., engine block 18). The coolant may be passed through spaced apart channels within cooler 76 and used to absorb heat from exhaust passing through adjacent channels. It should be noted that cooler 76 may alternatively be another type of heat exchanger, if desired, such as an air-to-air heat exchanger.

In the disclosed embodiment, fewer than all of cylinders 20 are associated with EGR circuit 70. Specifically, bank 24 of cylinders 20 has electronically controlled compression relief valves 28 that are associated with EGR circuit 70, while bank 22 of cylinders 20 has traditional mechanically controlled compression relief valves 30 that are not associated with EGR circuit 70. Having only one bank of cylinders 20 associated with EGR circuit 70 may reduce complexity of EGR circuit 70, thus increasing reliability and reducing cost. In addition, equipping fewer than all of cylinders 20 with electronically controlled compression relief valves 28 may reduce cost as well. It is contemplated, however, that any number of cylinders 20 may be equipped with electronically controlled compression relief valves 28 and/or be associated with EGR circuit 70, as desired. It is further contemplated that any existing mechanically controlled compression relief valve 30 may be replaced with an electronically controlled compression relief valve 28 and/or retrofitted to be automatically controlled by controller 74.

Before, during, and/or after regulating exhaust flow through EGR circuit 70 via compression relief valves 28, controller 74 may receive data indicative of an operational condition of engine 12 and/or an actual flow rate, temperature, pressure, and/or constituency of exhaust within exhaust manifolds 46, 48 and/or EGR circuit 70. Such data may be received from one or more sensors 82 strategically located throughout exhaust system 16. In the disclosed embodiment, at least one sensor 82 is at least partially disposed in or adjacent to cylinder 20, EGR manifold 72, and exhaust manifolds 46, 48. However, any number of sensors 82 may be associated with controller 74 and located throughout power system 10, as desired. It should be noted that sensor 82 is shown in FIG. 1 as being associated with only one cylinder 20 for visual purposes and that one sensor 82 may be associated with each cylinder 20 in another embodiment. Sensors 82 may be configured to generate a signal indicating one or more parameters associated with engine 12 and/or exhaust system 16. It is contemplated that controller 74 may also receive data from another controller or computer (not shown) and/or from a user of engine 12.

Controller 74 may be configured to utilize stored algorithms, equations, subroutines, look-up maps and/or tables to analyze the operational condition data and determine a corresponding desired flow rate, quantity, and/or constituency of exhaust within passage 60 that sufficiently reduces generation of pollutants discharged to the atmosphere. Based on the desired flow rate, quantity, and/or constituency, controller 74 may then cause one or more compression relief valves 28 to open at the right timing relative to the power/exhaust/intake stroke of the associated piston of engine 12 and/or by a desired amount, such that the desired flow rate, quantity, and constituency of exhaust is passed through EGR circuit 70 into intake manifolds 42, 44.

INDUSTRIAL APPLICABILITY

The disclosed exhaust system may be implemented into any power system application where exhaust gas recirculation is utilized. The disclosed exhaust system may utilize an existing component of engine 12 to enhance its functional capabilities, thereby improving engine efficiency and performance. Specifically, compression relief valves 28 may provide traditional functions of decreasing pressure within their respective combustion chambers prior to engine startup, as well as selectively recirculating exhaust flow back into engine 12 during normal engine operation. The multi-purpose nature of compression relief valves 28 may help to reduce the number of components required in exhaust system 16, thereby reducing cost and control complexity of power system 10. Operation of EGR circuit 70 will now be described with reference to FIG. 1.

Prior to engine startup, an operator of engine 12 may manually adjust compression relief valves 30 to at least partially open one or more valves. Meanwhile, controller 74 may receive an input command from the operator and generate a signal to cause a solenoid to at least partially open one or more compression relief valves 28. It is contemplated that controller 74 may also receive a signal from sensors 82 indicative of a pressure level within one or more combustion chambers, determine whether the pressure is at a level suitable for normal engine operation, and automatically open one or more compression relief valves 28 based on the pressure. Once one or more compression relief valves 28, 30 are open, the operator may cause engine 12 to rotate at least one revolution, allowing the pistons of cylinders 20 to push air and/or liquid out of the combustion chambers and decrease the pressure within each respective combustion chamber to a pressure level suitable for normal engine operation. In the disclosed embodiment, air and/or liquid flowing through compression relief valves 30 is released to the atmosphere, while air and/or liquid flowing through compression relief valves 28 is released to EGR manifold 72, where it may continue through exhaust system 16.

This decompression process may aid engine startup in some applications by reducing substantially high pressures within the combustion chambers prior to normal engine operation. In some applications, if the operator detects a substantial amount of liquid coming out of one or more of compression relief valves 30, or if sensors 82 detect a substantially high pressure level within one or more combustion chambers, then the operator may decide not to start engine 12 and to inspect power system 10 further. Otherwise, the operator may manually adjust compression relief valves 30 to close the valves and input a command to controller 74 to cause the solenoid to close compression relief valves 28, in preparation for normal engine operation.

During normal engine operation, air may be drawn from the atmosphere, pressurized by compressor 32, and directed into cylinders 20 by way of intake manifolds 42, 44. At any time before, during, and/or after this ingress of pressurized air, fuel may be supplied to and mixed with the air inside the combustion chamber of each cylinder 20. Upward movement of the piston of each cylinder 20 may result in combustion of the fuel/air mixture, generation of exhaust, and the returning downward motion of the piston. At some point during the downward motion of the piston, a portion of the exhaust may be discharged from the combustion chambers through exhaust manifolds 46, 48 to turbine 34.

Also, during normal engine operation, compression relief valves 28 may be selectively opened at any time to allow a portion of the exhaust from one or more cylinders 20 to flow through EGR circuit 70 and back into engine 12 via intake manifolds 42, 44. For example, compression relief valve 28 may be selectively opened during at least a portion of the power/exhaust/intake stroke of the associated piston, during or after combustion of the air/fuel mixture when pressures within the combustion chambers are high enough to push the exhaust out of the combustion chambers and through EGR circuit 70. Specifically, exhaust may flow from the combustion chambers through EGR circuit 70 and into intake manifolds 42, 44 when a pressure of the exhaust is greater than a pressure of the air within intake manifolds 42, 44. Accordingly, controller 74 may be programmed to generate an electronic command signal directed to compression relief valves 28 at this desired timing based on sensed conditions from sensors 82 and maps stored in the memory, causing compression relief valves 28 to open to the flow-passing position.

In one embodiment, compression relief valves 28 may be opened during a portion of the power stroke when the pressure level within the respective cylinder 20 is about 25 bar. Compression relief valves 28 may stay open into a portion of the exhaust stroke until the pressure level within the respective cylinder 20 is less than about 10 bar. Opening and closing compression relief valves 28 at these particular pressure levels may allow a desired amount of exhaust from cylinder 20 to be recirculated back into intake manifolds 42, 44. The desired amount of recirculated exhaust may be an amount sufficient to produce lower combustion temperatures and thus, a corresponding reduced amount of undesirable emissions.

As exhaust flows through EGR circuit 70, the exhaust may be cooled by cooler 76 prior to being directed to intake manifolds 42, 44. Additionally, the exhaust may be divided into two substantially equal streams that flow into passages 78, 80, allowing separate connections with intake manifolds 42, 44.

The disclosed exhaust system may sufficiently reduce emissions and provide advantages over traditional EGR strategies. In particular, the use of electronically-controlled compression relief valves 28 in EGR circuit 70 may allow the valves to be opened and closed at a desired timing and/or pressure during normal engine operation, thereby reducing backpressure in the exhaust system and improving fuel efficiency. Additionally, the disclosed exhaust system may not require a conventional EGR pump or blower and associated control circuitry, thus further reducing backpressure and reducing the cost of the exhaust system.

It will be apparent to those skilled in the art that various modifications and variations can be made to the disclosed exhaust system. Other embodiments will be apparent to those skilled in the art from consideration of the specification and practice of the disclosed exhaust system. It is intended that the specification and examples be considered as exemplary only, with a true scope being indicated by the following claims and their equivalents.

What is claimed is:

1. An exhaust system for an engine, comprising:
   an electronically controlled compression relief valve associated with a first engine cylinder;
   a mechanically controlled compression relief valve associated with a second engine cylinder, the mechanically controlled compression relief valve being in direct fluid communication with the atmosphere and wherein the mechanically controlled compression relief valve is manually opened by an operator prior to engine startup; and
   an exhaust gas recirculation passage extending from the electronically controlled compression relief valve to an intake of the first and second engine cylinders.

2. The exhaust system of claim 1, further including a controller in communication with the electronically controlled compression relief valve and configured to selectively cause the electronically controlled compression relief valve to move between a flow-passing and a flow-blocking position.

3. The exhaust system of claim 2, further including at least one sensor in communication with the controller and configured to generate a signal indicative of a pressure associated with the first engine cylinder.

4. The exhaust system of claim 3, wherein the controller is configured to at least partially open the electronically controlled compression relief valve during normal engine operation based on the signal indicative of the pressure associated with the first engine cylinder.

5. The exhaust system of claim 3, wherein the controller is configured to at least partially open the electronically controlled compression relief valve prior to engine startup based on the signal indicative of the pressure associated with the first engine cylinder.

6. The exhaust system of claim 3, wherein the controller is configured to at least partially open the electronically controlled compression relief valve prior to engine startup based on an operator input command.

7. The exhaust system of claim 2, wherein the controller is configured to selectively open the electronically controlled compression relief valve during normal engine operation in order to recirculate a desired amount of exhaust back into the intake of the first and second engine cylinders.

8. The exhaust system of claim 1, wherein the mechanically controlled compression relief valve remains closed during normal engine operation.

9. The exhaust system of claim 1, wherein:
   the electronically controlled compression relief valve includes a plurality of electronically controlled compression relief valves associated with all engine cylinders located within a first bank of engine cylinders; and
   the mechanically controlled compression relief valve includes a plurality of mechanically controlled compression relief valves associated with all engine cylinders located within a second bank of engine cylinders.

10. A method of handling exhaust from an engine, comprising:
    manually opening a mechanically controlled compression relief valve to release at least one of air or liquid directly to the atmosphere and decrease a pressure associated with a first engine cylinder prior to engine startup; and
    selectively opening an electronically controlled compression relief valve to send exhaust from a second engine cylinder through an exhaust gas recirculation passage and back into the first and second engine cylinders during normal engine operation.

11. The method of claim 10, wherein selectively opening the electronically controlled compression relief valve during normal engine operation includes:
    sensing a pressure associated with the second engine cylinder; and
    selectively opening the electronically controlled compression relief valve based on the pressure.

12. The method of claim 11, wherein selectively opening the electronically controlled compression relief valve based on the pressure includes opening the electronically controlled compression relief valve when the pressure within the second engine cylinder is 25 bar.

13. The method of claim 12, further including closing the electronically controlled compression relief valve when the pressure within the second engine cylinder is less than 10 bar.

14. The method of claim 10, wherein opening the mechanically controlled compression relief valve prior to engine startup includes:
    receiving an operator input command; and
    opening the compression relief valve based on the input command.

15. The method of claim 14, further including:
    sensing a pressure associated with the second engine cylinder prior to engine startup;
    determining whether the pressure is at a level suitable for normal engine operation; and automatically opening the electronically controlled compression relief valve based on the pressure.

16. A power system, comprising:
an engine block at least partially defining a first bank of cylinders and a second bank of cylinders, each of the cylinders having at least one intake valve and at least one exhaust valve;
a first intake manifold in fluid communication with the first bank of cylinders;
a second intake manifold in fluid communication with the second bank of cylinders;
a plurality of electronically controlled compression relief valves associated with the first bank of cylinders;
a plurality of mechanically controlled compression relief valves associated with the second bank of cylinders, the plurality of mechanically controlled compression relief valves being in direct fluid communication with the atmosphere and wherein each of the mechanically controlled compression relief valves is manually opened by an operator prior to engine startup;
an exhaust gas recirculation passage extending from only the plurality of electronically controlled compression relief valves to the first and second intake manifolds; and
a controller configured to:
selectively open at least one of the plurality of electronically controlled compression relief valves to decrease a pressure associated with the first bank of cylinders prior to engine startup; and
selectively open at least one of the plurality of electronically controlled compression relief valves to send exhaust from the first bank of cylinders through the exhaust gas recirculation passage and back into the first and second intake manifolds during normal engine operation.

17. The exhaust system of claim 1, wherein each of the first and second engine cylinders have at least one intake valve and at least one exhaust valve.

18. The power system of claim 16, wherein each of the plurality of mechanically controlled compression relief valves remains closed during normal engine operation.

\* \* \* \* \*